Figure 1:
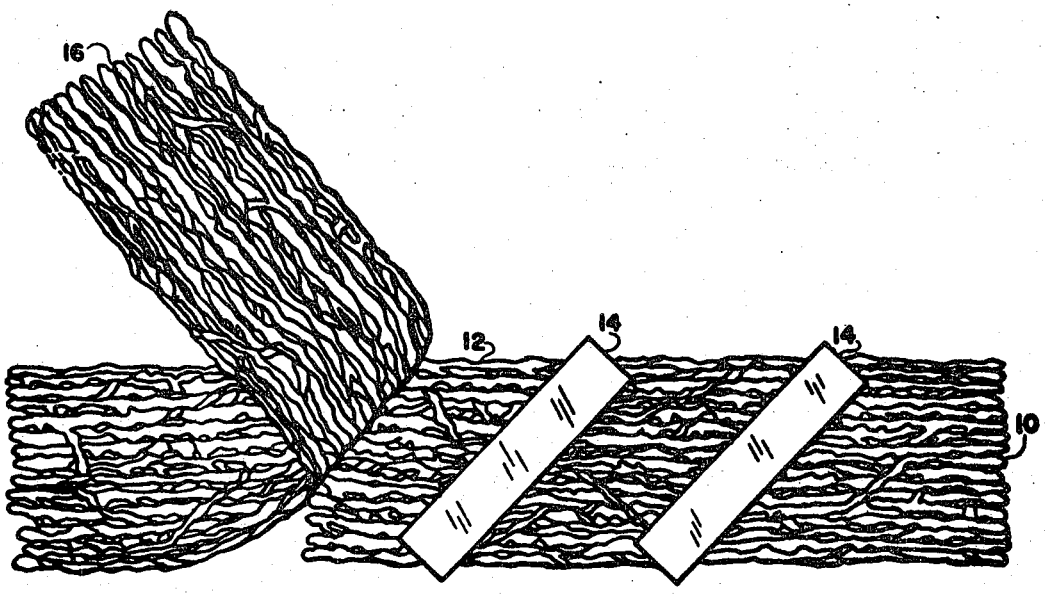
Figure 2:
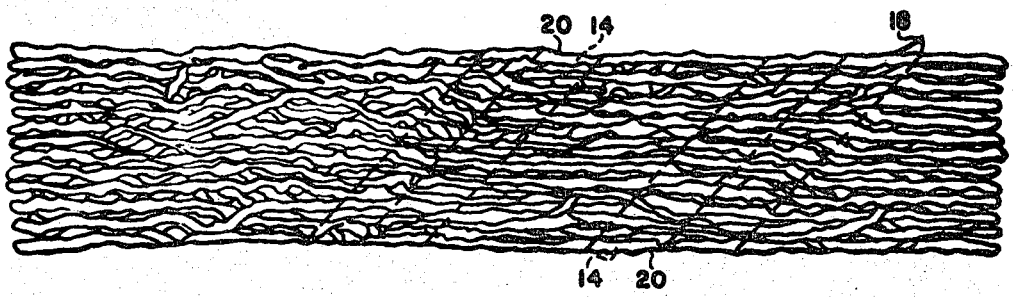
Figure 3:
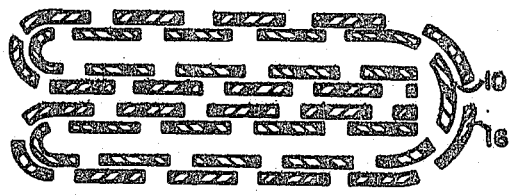
Figure 4:
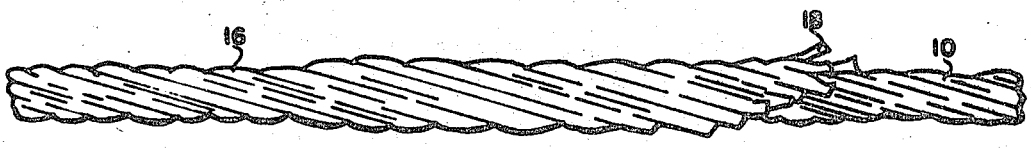
Figure 5:
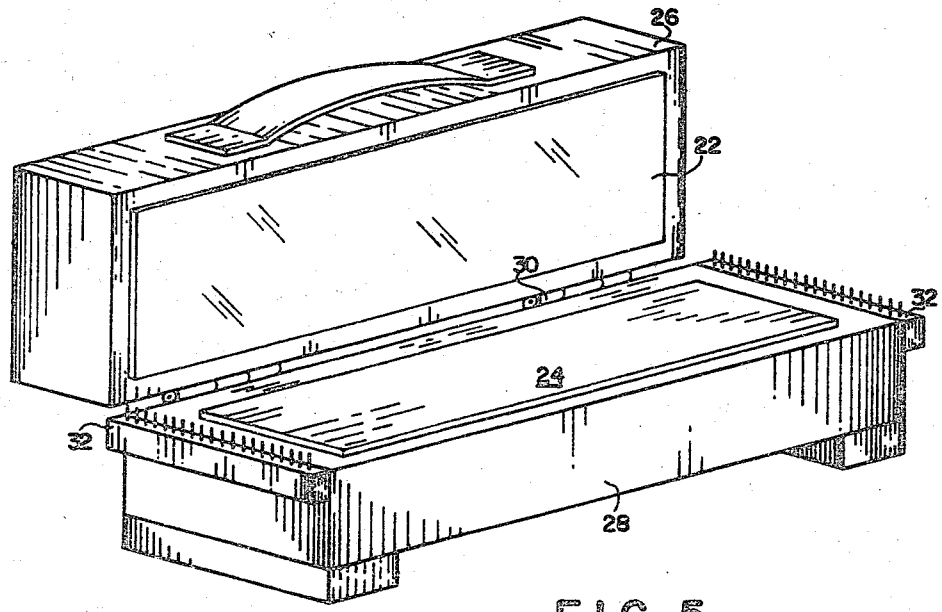

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 10, 1970

871 O.G. 354

T871,001
METHOD AND APPARATUS FOR SPLICING TEXTILE PRODUCTS

Leron R. Dean, P.O. Box 511,
Kingsport, Tenn. 37662

Filed Nov. 15, 1967, Ser. No. 683,372
Int. Cl. B65h *69/02*
U.S. Cl. 156—158
3 Sheets Drawing. 15 Pages Specification

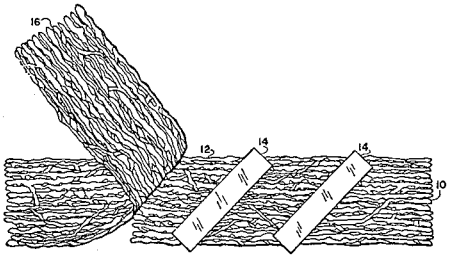

A splice is formed by spreading the ends of textile-like yarns so that the individual filaments thereof do not overlay one another, placing at least one heat activatable film strip across one of the strands, overlapping the spread strands with both strands contacting the strip, applying heat to activate the strip and join the strands. The splice may be folded to enclose one of the strands within the other. The apparatus for accomplishing the splice consists of a pair of heated platens hinged together with spreading combs located at the opposite ends thereof.

Feb. 10, 1970 L. R. DEAN T871,001

METHOD AND APPARATUS FOR SPLICING TEXTILE PRODUCTS

Filed Nov. 15, 1967 3 Sheets-Sheet 1

Leron R. Dean
INVENTOR

BY William J. French
George P. Chandler
ATTORNEYS

METHOD AND APPARATUS FOR SPLICING TEXTILE PRODUCTS

Filed Nov. 15, 1967 3 Sheets-Sheet 2

Loren R. Dean
INVENTOR
BY William T. French
George P. Chandler
ATTORNEYS

Feb. 10, 1970 L. R. DEAN T871,001

METHOD AND APPARATUS FOR SPLICING TEXTILE PRODUCTS

Filed Nov. 15, 1967 3 Sheets-Sheet 3

Leron R. Dean
INVENTOR

BY William T. French
George P. Chandler
ATTORNEYS